United States Patent [19]

Jackson

[11] Patent Number: 5,438,702
[45] Date of Patent: Aug. 1, 1995

[54] BICYCLE HELMET COMMUNICATION DEVICE

[76] Inventor: Reed B. Jackson, 4247 Blaisdell Ave. South, Minneapolis, Minn. 55409

[21] Appl. No.: 174,147

[22] Filed: Dec. 28, 1993

[51] Int. Cl.⁶ .................................................. H04B 1/38
[52] U.S. Cl. .................................... 455/89; 455/90; 455/100; 455/344; 455/350; 455/351; 2/422; 2/425; 381/187
[58] Field of Search ................. 455/74, 89, 90, 95, 455/100, 128, 344, 347, 348, 349, 350, 351; 2/422, 425; 381/25, 183, 187; 379/430; 340/427, 432

[56] References Cited

U.S. PATENT DOCUMENTS

| | | | |
|---|---|---|---|
| 1,560,718 | 11/1925 | Nowosielski | 381/187 |
| 3,272,926 | 9/1966 | Falkenberg | 381/187 |
| 3,586,977 | 6/1971 | Lustig et al. | 455/351 |
| 3,889,190 | 6/1975 | Palmer | 455/90 |
| 3,916,312 | 10/1975 | Campbell | 2/422 |
| 4,109,105 | 8/1978 | Von Statten, Jr. | 2/422 |
| 4,130,803 | 12/1978 | Thompson | 455/344 |
| 4,152,553 | 5/1979 | White | 379/430 |
| 4,340,972 | 7/1982 | Heist | 455/95 |
| 4,471,174 | 9/1984 | Nava | 379/430 |
| 4,607,395 | 8/1986 | Sundahl | 455/100 |
| 4,648,131 | 3/1987 | Kawaguchi et al. | 359/172 |
| 4,788,724 | 12/1988 | Laaeroni et al. | 2/422 |
| 4,833,726 | 5/1989 | Shinoda et al. | 455/89 |
| 5,046,192 | 9/1991 | Ryder | 381/187 |
| 5,119,505 | 6/1992 | Tisseront et al. | 455/89 |
| 5,142,700 | 8/1992 | Reed | 455/90 |
| 5,337,421 | 8/1994 | Jeng | 2/425 |
| 5,341,512 | 8/1994 | Noble | 2/422 |

*Primary Examiner*—Edward F. Urban
*Assistant Examiner*—Andrew Faile
*Attorney, Agent, or Firm*—Palmatier, Sjoquist & Helget

[57] ABSTRACT

The present invention relates to a bicycle helmet and communication device for use by children. The invention includes a bicycle helmet having a notch extending from a boundary edge upwardly toward a crown portion. A sleeve is positioned within, and affixed to, the notch. A communication module having an adjustable slide, an earpiece, an antenna, and a boom having a microphone is positioned proximal to the notch for positioning, and adjustably attaching, the slide to the sleeve. The adjustable engagement between the slide and sleeve permits the positioning of the earpiece over the ear and the microphone proximal to the mouth of a child wearing the bicycle helmet and communication device. A power module having a transmitter and a receiver is remotely attached to the communication module by a cable. The power module is adapted for engagement to a user's belt. The microphone is connected to the transmitter which is voice activated by an individual. The bicycle helmet communication device provides an incentive to a child to wear a bicycle helmet thereby improving the safety to a child.

14 Claims, 2 Drawing Sheets

BICYCLE HELMET COMMUNICATION DEVICE

BACKGROUND OF THE INVENTION

A number of states and municipalities are requiring bicyclists, and more particularly children bicyclists, to wear protective helmets during the riding of bicycles. Bicycle helmets as known do not allow remotely located riders to communicate with one another or with a base station. No device as known exists which may be attached to a bicycle helmet for provision of an enjoyable and functional communication system between riders and/or riders and a base station such as a home.

A bicycle helmet is required to be of sturdy construction for protection of the head of a rider. The integrity of a bicycle helmet is fundamental for the provision of a safety device to an individual. Most bicycle helmets are generally formed of polystyrene styrofoam material which may or may not include an exterior polycarbonate or plastic shell. The inclusion of a communications device in a bicycle helmet may not adversely affect the structural strength and/or integrity of a bicycle helmet as used by an individual.

A problem with a typical bicycle helmet concerns the lack of incentive for a child to continuously wear the safety helmet device. Children frequently rebel from the use of protective devices, and more particularly rebel against the use of bicycle helmets. In the past, various artistic methods have been utilized to attract children to a bicycle helmet, and to provide an incentive for the child to wear the safety device.

The present invention, by incorporating a communication system into a bicycle helmet, encourages children to wear a bicycle safety device. The inclusion of a communication system into a bicycle helmet provides an enjoyable reason for a child to continue to wear a bicycle helmet while riding a bicycle. In addition, several functional applications exist providing a parent with the ability to communication with a child without leaving home in search of a child's location. In addition, a bicycle helmet utilizing a communication system as described herein may be useful by law enforcement agencies which now employ the use of bicycles in patrol areas.

SUMMARY OF THE INVENTION

The present invention relates to a bicycle helmet and communication device for use by children. The invention includes a bicycle helmet having a notch extending from a boundary edge upwardly toward a crown portion. A sleeve is positioned within, and affixed to, the notch. A communication module having an adjustable slide., an earpiece, an antenna, and a boom having a microphone is positioned proximal to the notch for positioning, and adjustably attaching, the slide to the sleeve. The adjustable engagement between the slide and sleeve permits the positioning of the earpiece over the ear and the microphone proximal to the mouth of a child wearing the bicycle helmet and communication device. A power module having a transmitter and a receiver is remotely attached to the communication module by a cable. The power module is adapted for engagement to a user's belt. The microphone is connected to the transmitter which is voice activated by an individual. The bicycle helmet communication device provides an incentive to a child to wear a bicycle helmet thereby improving the safety to a child.

It is an object of the present invention to provide a bicycle helmet and communication device of relatively simple and inexpensive design, construction and operation which is safe, and which fulfills the intended purpose of protecting children, and improves the enjoyment of a helmet to a bicycle rider without fear of injury to persons and/or damage to property.

It is another object of the present invention to provide a bicycle helmet and communication device which establishes two-way communication between two or more remotely located bicyclists, or a bicyclist and a base station.

It is still another object of the present invention to provide a bicycle helmet and communication device which encourages children to wear a safety bicycle helmet.

It is still another object of the present invention to incorporate a voice-activated communication system into a bicycle helmet for increasing the enjoyment to an individual.

It is still another object of the present invention to provide a means for communication with a remotely located child bicyclist.

It is still another object of the present invention to provide a convenient wireless communication system between two or more bicyclists.

It is still another object of the present invention to provide a bicycle helmet and communication device which incorporates standardized safety features.

A feature of the present invention includes a shell having a crown, opposite side portions, a boundary edge, and a chin strap.

Another feature of the present invention includes a notch extending upwardly from the boundary edge toward the crown of the shell.

Still another feature of the present invention includes a sleeve affixed to, and positioned within, the notch for receiving engagement of a slide which adjustably attaches a communication module to the shell.

Still another feature of the present invention is a wireless two-way voice activated communication module having a base, an adjustable boom having a microphone, an earpiece, an adjustable slide, and an antenna.

Still another feature of the present invention is an artistically colored cover formed of an elastic material for covering the shell, crown, notch, sleeve, and antenna.

Still another feature of the present invention is a power module having a transmitter, receiver, and amplifier which is connected to the communication module via a cable where the power module is positioned proximal to the waist of bicyclist.

DETAILED SPECIFICATION OF THE PREFERRED EMBODIMENT

Figure 1:
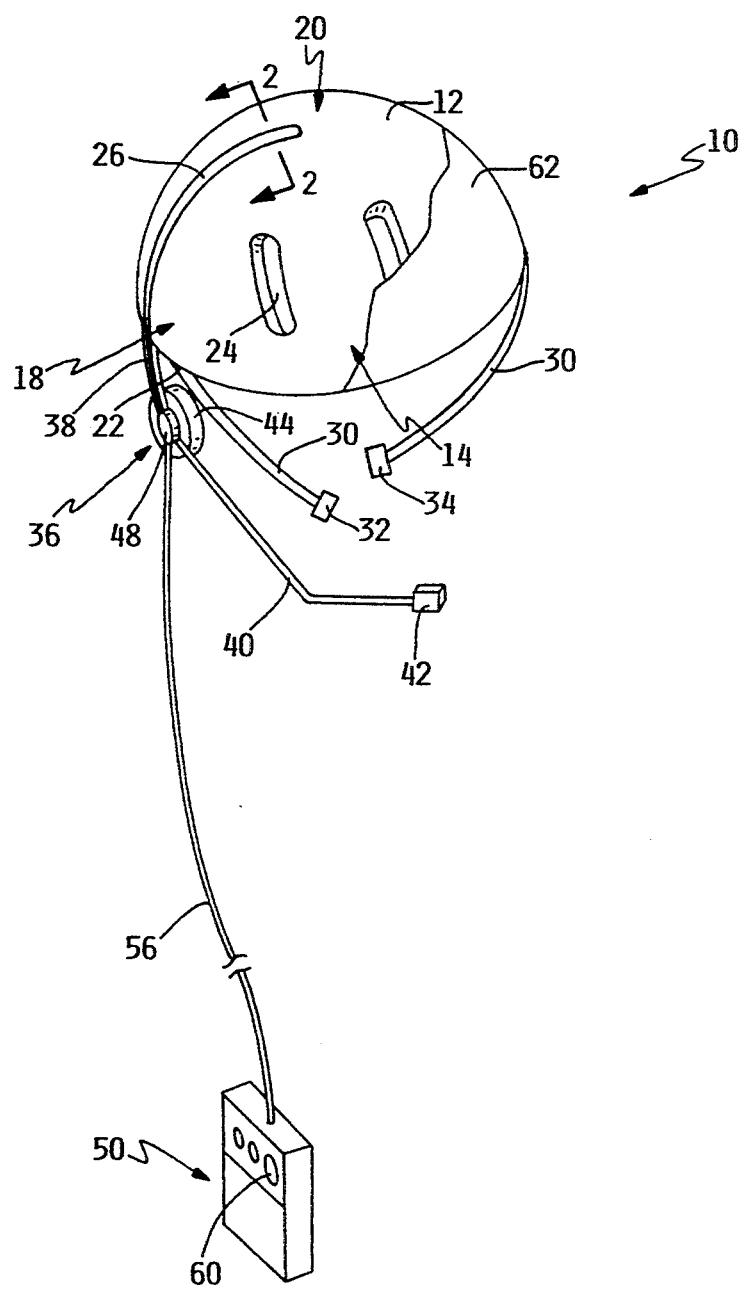
FIG. 1 is an isometric view of the invention.
Figure 2:
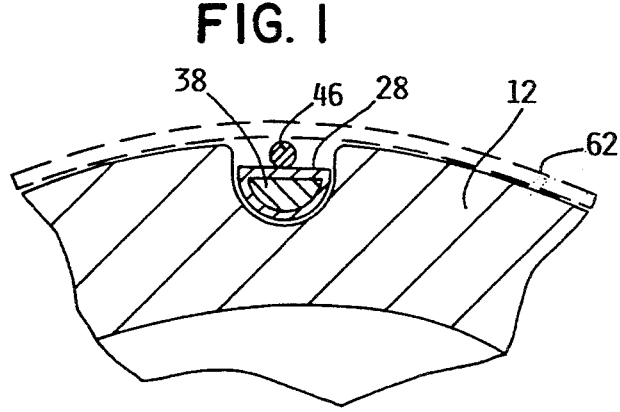
FIG. 2 is a cross-sectional side view of the invention taken along line 2—2 of FIG. 1.

One form of the invention is illustrated and described herein. The bicycle helmet communication device is indicated in general by the numeral 10.

The bicycle helmet communication device 10 includes an oval-shaped shell 12 which is preferably molded of thermoplastic polystyrene material. The shell 12 in general includes a front 14, a back, and a pair of opposite side portions 18. The shell 12 also includes a dome-shaped crown portion 20 and a boundary edge 22. A plurality of air apertures 24 preferably traverse the dome-shaped crown portion 20 providing air circulation proximal to a user's head. The shell 12 preferably has an interior which receives Velcro ® pads for the receiving accommodation of various-sized contoured foam felt liners in order to fit various head sizes.

The shell 12 is preferably tested and approved by the Snell Foundation for safety standards. The polystyrene material selected for the shell 12 preferably absorbs and distributes shock, thereby functioning as a bicycle safety mechanism for a child. Preferably the shell 12 approximates 6.75 ounces in weight. Alternatively, the shell 12 may be formed of any thermal plastic material provided that the essential functions, features, and attributes described herein are not sacrificed. The shell 12 may be enclosed within a rigid plastic material for the provision of additional safety protection to an individual. The diameter dimension selected for the shell 12 may vary widely for use with a variety of individual head sizes. In the preferred embodiment, the shell 12 is preferably adapted for wearing by a child bicyclist.

The shell 12 preferably includes a notch 26 which is centrally located with respect to one of the pair of opposite side portions 18 and the boundary edge 22, and extends perpendicularly upward therefrom towards the dome-shaped crown portion 20. The notch 26 preferably has a length dimension approximating six inches, a width dimension approximating 0.25 inch, and a depth dimension approximating 0.5 inch. The notch 26 functions as the location for the attachment of a communication module 36 to the shell 12. The size of the notch 26 preferably does not adversely affect the structural strength, durability, or safety rating for the shell 12.

The shell 12 may include a plurality of equally spaced and aligned engagement depressions 27 which are preferably positioned within the notch 26. The engagement depressions 27 are preferably centrally aligned and positioned within the base portion of the notch 26. The engagement depressions 27 are thereby positioned at a maximum depth from the exterior or outer surface of the shell 12. The engagement depressions 27 are preferably adapted for receiving engagement of a retaining screw 64, which may be used to attach the slide 38 to the sleeve 28 and to the shell 12. The engagement depressions 27 may be of any size as preferred by an individual, provided that the structural strength and/or integrity of the shell 12 is not sacrificed. Additionally, the engagement depressions 27 should be of sufficient size for receiving engagement of the retaining screw 64.

A sleeve 28 is preferably positioned within, and is affixed to, the notch 26. The sleeve 28 preferably has a thickness dimension approximating 0.03 inch. The sleeve 28 is preferably centrally positioned within the notch 26. A portion of the thickness of shell 12 approximating 0.2485 inch preferably exists below and above the sleeve 28 within the notch 26. The sleeve 28 preferably has a width dimension approximating 0.25 inch.

The sleeve 28 is preferably adapted for receiving engagement of the slide 38 for securing the communication module 36 to the shell 12. The sleeve 28 is preferably molded of plastic material; however, any material may be selected including, but not limited to, the use of metals, fiberglass, or other suitable materials provided that the essential functions, features, and attributes described herein are not sacrificed. The interior of the sleeve 28 may include a plurality of equally spaced receiving tab members 29 which provide a series of ledges for vertical positioning of the slide 38. Alternatively, the sleeve 28 may include a plurality of equally spaced second apertures 29.1 positioned therethrough, which are preferably aligned to the engagement depressions 27 located within the notch 26. Any means for positioning may be selected by an individual to provide for the adjustable engagement of the slide 38 to the sleeve 28 provided that the essential functions, features, and attributes described herein are not sacrificed.

The sleeve 28 may be affixed to the notch 26 by a retaining screw 64. The retaining screw 64 may pass through the slide 38 and second apertures 29.1 for attachment to the engagement depressions 27 affixing the slide 38 and sleeve 28 to the shell 12. The retaining screw 64 preferably fixedly positions the slide 38 at a desired vertical location within the sleeve 28. A second retaining screw 64 may be used to affix the slide 38 to the sleeve 28 and to the shell 12. The second retaining screw 64 may be positioned proximate to the boundary edge 22 within the notch 26. Alternatively, any preferred means may be used by an individual to affix the sleeve 28 within the notch 26 including, but not limited to, the use of screws, adhesives, bolts and nuts, and/or rivets, provided that inadvertent separation of the sleeve 28 from the notch 26 does not occur.

The notch 26 may be milled or grooved from the shell 12. Alternatively, the notch 26 may be molded directly during fabrication of the shell 12. It should be noted that the notch 26 does not adversely effect the structural strength or durability of the shell 12, and does not impact or adversely effect the safety rating provided for the bicycle helmet functioning as a portion of the bicycle helmet communication device 10.

In an alternative embodiment, the sleeve 28 may be securely affixed to the exterior of the crown portion 20 by any means as preferred by an individual provided that the affixation method selected prevents the inadvertent separation of the communication module 36 from the shell 12 during use of the bicycle helmet and communication device 10. Alternatively, the sleeve 28 may be forcibly inserted into the polystyrene material of the shell 12 for affixation of the communication module 36. It should be noted that in this embodiment that the sleeve 28 is formed of a rigid metallic or plastic material of sufficient strength and durability to not fracture, bend, or break during penetrating insertion into the shell 12. In another alternative embodiment, the sleeve 28 may be molded to the shell 12 for the provision of an integrally connected receiving member for engagement to the slide 38 during the affixation of the communication module 36 to the shell 12.

A chin strap 30 is preferably affixed to each of the pair of opposite side portions 18 of the shell 12. The chin strap 30 is preferably formed of a nylon web material and includes a penetrating member 32 and a receiving member 34 for adjustable affixation below the chin of an individual. The chin strap 30 is preferably affixed through the shell 12 proximate to the boundary edge 22. The affixation of the chin strap 30 to the shell 12 does not adversely effect the structural strength and durability, and/or the safety rating for the bicycle helmet communication device 10. The length, width, and thickness dimensions selected for the chin strap 30 may be suitably varied at the discretion of an individual provided that the essential functions, features, and attributes described herein are not sacrificed. The length dimension selected for the chin strap 30 is preferably of sufficient size to traverse below the chin of a child bicyclist.

The communication module is preferably indicated in general by the numeral 36. The communication module 36 is preferably voice activated for providing wireless two-way communication between bicyclists and/or a bicyclist and a base station. In general, the communication module 36 includes the elements of the slide 38, boom 40, microphone 42, earpiece 44, and antenna 46 which are intricately connected to a base 48. The communication module 36 preferably operates at a frequency and power output level below Federal Communications Commission (FCC) required standards, thereby permitting use by an individual without the necessity of obtaining a communication license. Preferably the communication module 36 has a transmission range of one-quarter mile. The transmission range indicated herein may be suitably increased or decreased at the preference of an individual in order to comply with FCC rules and regulations.

The base 48 is preferably circular in shape and is aligned to, and positioned below, the notch 26. The base 48 additionally is positioned below the boundary edge 22 proximate to an individual's ear. The base 48 is preferably formed of a metal material; however, any material may be selected at the preference of an individual including, but not limited to, the use of rigid plastics.

The slide 38 is preferably rigidly affixed to the base 48 extending vertically upward therefrom. The slide 38 preferably has a width dimension approximating .25 inch and a length dimension approximating seven inches. The slide 38 is preferably formed of a metallic material for penetrating and sliding engagement into the sleeve 28. Any material may be used to form the slide 38 at the preference of an individual including, but not limited to, the use of plastics. The interaction between the slide 38 and the sleeve 28 permits the vertical adjustment of the base 48 for positioning of the earpiece 44 proximate to an ear of an individual.

The slide 38 may include a plurality of equally spaced penetrating extension members 39 which are preferably adapted for penetrating engagement and interaction to the receiving tab members 29 of the sleeve 28. The interaction of the penetrating extension members 39 to the receiving tab members 29 provides for the adjustable engagement of the slide 38 to the sleeve 28 for positioning of the ear piece 44 proximate to an individual's ear. The slide 38 may be either raised or lowered with respect to the sleeve 28 and shell 12 by the release of the retaining screw 64 and the repositioning of the receiving tab members 29 with respect to the penetrating extension members 39. The tightening of the retaining screw 64 causes the mating engagement between the receiving tab members 29 and the penetrating extension members 39, for positioning of the slide 38 at a desired vertical level with respect to the sleeve 28. The retaining screw 64 is preferably a threaded thumb screw which is engaged to a threaded second aperture 29.1 for tightening of the penetrating extension members 39 against the receiving tab members 29.

Figure 3:
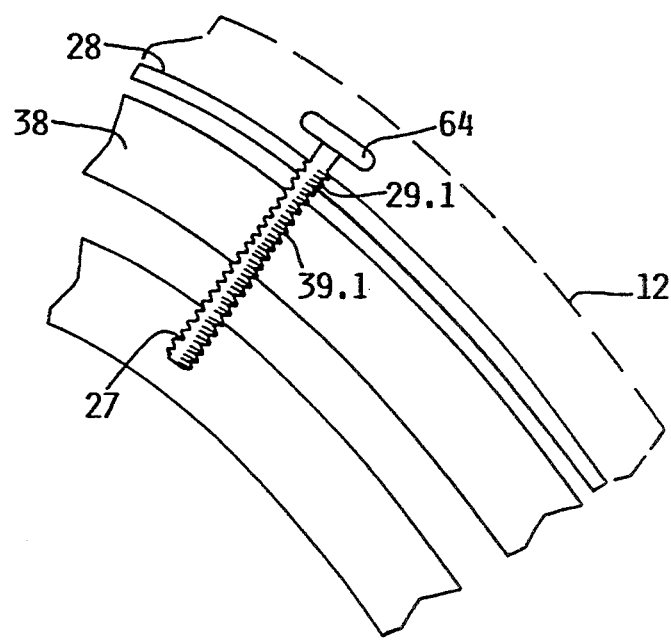
FIG. 3 is a detail cross-sectional side view taken along the line of 3—3 of FIG. 1.
Figure 4:
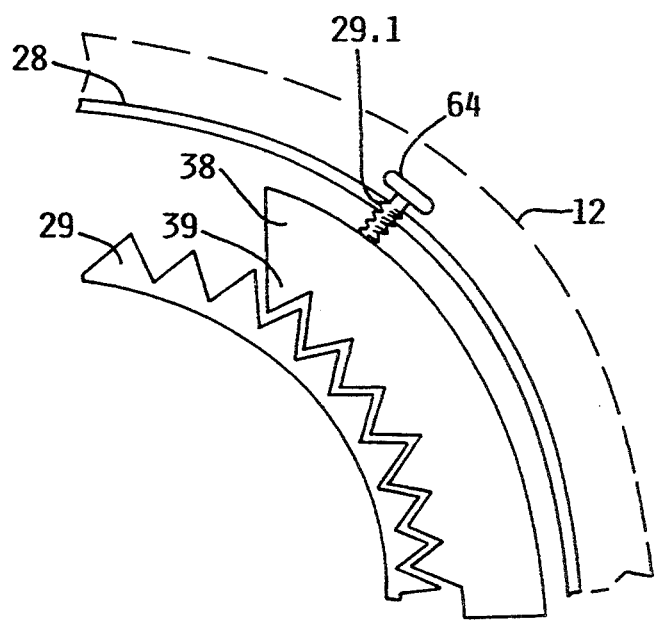
FIG. 4 is an alternate detail cross-sectional side view taken along the line of 3—3 of FIG. 1.

Alternatively, the slide 38 may include a plurality of equally spaced and aligned third apertures 39.1. The third apertures 39.1 are preferably aligned to the second apertures 29.1 for receipt of a retaining screw 64 during the adjustment of the vertical level of the communication module 36 with respect to the ear of an individual. In this embodiment, the retaining screw 64 functions to simultaneously position the slide 38 relative to the sleeve 28 and functions to affix the slide 38 and sleeve 28 to the shell 12. (FIGS. 3 and 4)

The boom 40 is preferably affixed to and extends forwardly from the base 48. The boom 40 is preferably formed of a flexible plastic material having a suitable electrical wire enclosed therein. The boom 40 is preferably arcuate in shape for positioning of the microphone 42 proximate to the mouth of an individual. It should be noted that the shape of the boom 40 may be molded by an individual for positioning of the microphone 42 at a desired location with respect to the mouth of an individual. The boom 40 is preferably formed of sufficiently durable material to not fracture, bend, break or fail during use of the bicycle helmet communication device 10 particularly with respect to a child bicycle rider. It should be noted that the boom 40 is pliable for adjustable positioning at a desired location by an individual. The boom 40 preferably bends upon engagement to the face of an individual during impact resulting from an accident, thereby significantly reducing the risk of injuries to an individual during use of the bicycle helmet communication device 10. The boom 40 preferably has a length dimension approximating seven inches and a diameter dimension 0.25 inch. The length and diameter dimensions indicated herein have been provided for illustrative purposes only and may be suitably varied at the discretion of an individual.

A microphone 42 is preferably affixed to the end of the boom 40 opposite to the base 48. The microphone 42 preferably includes noise-cancelling crystal components which may be available from a suitable electronics supplier. The microphone 42 preferably functions to generate communication signals for transmittal between remotely positioned bicycle riders and/or a remotely located base station. The microphone 42 preferably includes superheterodyne circuitry for the transmission of low-noise signals. It should be noted that any preferred type of microphone 42 may be attached to the boom 40 provided that the essential functions, features, and attributes described herein are not sacrificed. The microphone 42 is preferably voice-activated for two-way communication between riders. The microphone 42 permits the communication between two bicycle riders without the manipulation of any switches permitting a child bicycle rider to keep both hands on the handlebars of a bicycle during operation. Child bicycle riders are thereby provided with the opportunity to concentrate on the balance and steering requirements for operation of a bicycle as opposed to manipulation of switches for activation of a communication system.

The earpiece 44 is preferably affixed to and extends inwardly from the base 48. The earpiece 44 is preferably electrically connected to the power module 50 for receipt of communication signals processed by the receiver/amplifier. The earpiece 44 is preferably circular in shape and is enclosed within a foam material. The earpiece 44 is preferably positioned over the ear of an individual during use of the bicycle helmet communication device 10. The adjustable positioning of the slide 38 relative to the notch 26 permits an individual to position the earpiece 44 proximal to the individual's ear. The earpiece 44 preferably includes a speaker (not shown) which may be obtained from an electrical supply outlet. The speaker of the earpiece 44 preferably includes superheterodyne circuitry facilitating the receipt of low-noise transmissions. The earpiece 44 may be mounted to the base 48 by any means including, but not limited to, the use of solder, screws, and/or a bolt. The earpiece 44 is rigidly affixed to the base 48 such that inadvertent separation therefrom does not occur.

One earpiece 44 is preferably used as a portion of the bicycle helmet communication device 10. The use of a single earpiece 44 enables a child bicycle rider to detect and hear other traffic sounds proximal to the bicycle rider's location. The ability of a child bicycle rider to detect sounds in the area proximal to his/her vicinity significantly enhances the safety to a bicycle rider.

An antenna 46 is preferably affixed to and extends vertically upward from the base 48. The antenna 46 is preferably a wire having an approximate diameter dimension of .032 inch and an approximate length dimension of twelve inches. The antenna 46 is preferably electrically connected to the power module 50 and receiver/amplifier. The antenna 46 is preferably flexible for positioning over the dome portion 20 of the shell 12 during use of the bicycle helmet communication device 10. The antenna 46 is preferably positioned perpendicular to the boundary edge 22 traversing between the pair of opposite side portions 18 while simultaneously being aligned with the notch 26. The antenna 46 is preferably attached to the shell 12, over the crown portion 20, by adhesive tape. Alternatively, the antenna 46 may be positioned vertically upwards from the base 48 at the preference of an individual. The antenna 46 functions to facilitate the receipt of communication signals as generated from remotely located communication modules 36 of other bicycle riders. The diameter and length dimensions provided herein for the antenna 46 may be suitably varied at the discretion of an individual provided that the essential functions, features, and attributes described herein are not sacrificed. The antenna 46 may be affixed to the base 48 by any means including, but not limited to, the use of solder, screws, and/or nuts and bolts.

The power module 50 is preferably remotely located from the communication module 36 and is electrically connected thereto by a cable 56. The power module 50 is preferably battery operated and supplies the energy for the communication module 36, the receiver/amplifier, and the transmitter. The cable 56 is preferably of a coaxial type having a flexible plastic coating which encloses at least one electrical wire. The cable 56 is preferably electrically connected to the antenna 46, earpiece 44, and microphone 42. The cable 56 preferably has a sufficient length for positioning of the power module 50 proximal to a bicycle rider's waist or belt.

The power module 50 preferably includes the elements of the receiver/amplifier and transmitter during use of the bicycle helmet communication device 10. The receiver/amplifier preferably detects signals as received by the antenna 46 for amplification and transmission to the earpiece 44 via the cable 56. The transmitter is preferably electrically connected to the microphone 42, via the boom 40 and cable 56, for transmittal of signals for detection by remotely located receivers. It should be noted that the cable 56 may have any length, which may approximate three feet in length. The length of the cable 56 may be shortened substantially for use with child bicycle riders. The power module 50 additionally includes an on/off switch 60.

The power module 50 may be affixed to the waist of a bicycle rider by a clip which may be attached to the rider's belt, or the power module 50 may include a strap for encircling an individual's waist. Any affixation means may be used to attach the power module 50 to an individual's waist provided that the essential functions, features, and attributes described herein are not sacrificed. Alternatively, the power module 50 may be suitably positioned within a waist pack as used by individuals. The power module 50 may also include a replacement battery pack for prolonging the operational life of the bicycle helmet communication device 10 during extended use conditions.

The transmitter and the receiver/amplifier include superheterodyne circuitry for the reception and transmission of low noise signals. The receiver/amplifier and the transmitter permit the wireless communication between users of the bicycle helmet communication device 10.

A cover 62 preferably surrounds the exterior of the shell 12 of the bicycle helmet communication device 10. The cover 62 may be formed of any flexible elastic material as desired by an individual. The cover 62 preferably has an elastic edge which is expanded for receiving engagement of the shell 12. The elastic edge of the cover 62 then is positioned proximal to, and below, the boundary edge 22 within the interior of the shell 12. The cover 62 preferably encloses the air apertures 24, notch 26, sleeve 28, slide 38, and antenna 46, providing a uniform outward appearance for the bicycle helmet communication device 10. The cover 62 may be artistically colored in any preferred pattern as desired by an individual to facilitate and encourage the use of the bicycle helmet communication device 10 by children. In addition, the cover 62 may be artistically colored to enhance the visibility of a bicycle rider to motor vehicles thereby reducing the risks of accidents and/or injuries to children. The cover 62 functions to assist in the positioning of the antenna 46 proximal to the crown portion 20 of the shell 12. The cover 62 also functions to provide an aesthetically pleasing outward appearance for the bicycle helmet communication device 10, thereby facilitating use by a child bicycle rider. It should be noted that any alternative material may be selected for the cover 62 provided that the essential functions, features, and attributes described herein are not sacrificed.

As depicted in FIG. 1, the communication module 36 is positioned for engagement over the right ear of an individual. Alternatively, the communication module 36 may be positioned over the left ear of an individual. The bicycle helmet communication device 10 simultaneously provides protection to the head of a bicyclist while allowing two-way communication to other riders. During use of the bicycle helmet communication device 10, the earpiece 44 is elevated or lowered via the slide 38 for comfortable positioning over an ear of an individual. The slide 38 attaches the earpiece 44, boom 40, microphone 42, and antenna 46 to the shell 12 during use of the bicycle helmet communication device 10. The helmet is then securely affixed to the head of an individual by engagement and adjustment of the chin strap 30. An individual may then manipulate the on/off switch 60 for providing power to the communication module 36. As an individual speaks, the voice activation unit of the microphone 42 is engaged initiating communication between riders. Children utilizing the bicycle helmet communication device 10 may then communicate freely and playfully with each other within a neighborhood community. The bicycle helmet communication device 10 may also be used by adult riders engaging in recreational bicycle activities such as cross country tours. In addition, parents are provided with a useful tool for locating and communicating with a child bicycle rider. Finally, the bicycle helmet communication device 10 encourages children bicycle riders to wear safety helmets during operation of a bicycle by enhancing the enjoyment of the bicycle helmet to an individual.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A bicycle helmet and communication device comprising:
   (a) a shell for protecting the head of a bicyclist, said shell having an interior, crown, and opposite side portions, a boundary edge encircling said shell, a notch extending upward from said boundary edge proximal to one of said side portions, a penetrating chin strap portion attached to said boundary edge proximate to one of said side portions, a receiving chin strap portion attached to said boundary edge proximate to said the opposite side portion of said shell for engagement to said penetrating chin strap portion, and a sleeve positioned in said notch, said sleeve being affixed to said shell;
   (b) a voice activated communication module permitting wireless communication between said bicyclist and another bicycle rider, said communication module having a base, said base having a forwardly extending boom having a microphone positioned proximate to the mouth of said bicyclist, said base further having an earpiece for positioning over an ear of said bicyclist, said base further having an upwardly extending adjustable slide positioned in said sleeve for adjustable attachment of said communication module to said shell, said communication module further having an antenna; and
   (c) a power module having a transmitter and a receiver connected to said communication module, said transmitter and said receiver providing signal processing for communication between said microphone and said earpiece and for providing communication between said bicyclist and said other bicycle rider.

2. The bicycle helmet communication device according to claim 1, wherein said shell has an oval shape and said crown has a dome shape, said shell further comprising a plurality of air passages and a front and back portion.

3. The bicycle helmet communication device according to claim 2, wherein said notch extends from said boundary edge to said crown portion.

4. The bicycle helmet communication device according to claim 3, wherein said base is positioned proximate to said boundary edge.

5. The bicycle helmet communication device according to claim 4, wherein said forwardly extending boom has an adjustable arcuate shape for positioning of said microphone proximate to the mouth of said bicyclist.

6. The bicycle helmet communication device according to claim 5, wherein said earpiece extends inwardly from said base for positioning proximate to said ear of said bicyclist.

7. The bicycle helmet communication device according to claim 6, wherein said antenna is flexible and is attached to said base extending upwardly therefrom, said antenna being foldably positioned and secured to said shell and said base is connected to said receiver.

8. The bicycle helmet communication device according to claim 7, wherein said power module has a cable connected to said communication module wherein said power module is remotely located from said communication module and said power module processes signals generated by said microphone or detected by said antenna.

9. The bicycle helmet and communication device according to claim 8, wherein a cover is engaged to and encircles said boundary edge for covering of said shell, said antenna, said notch, and said sleeve.

10. The bicycle helmet communication device according to claim 9, wherein said shell is formed of thermoplastic polystyrene material.

11. The bicycle helmet communication device according to claim 9, wherein said cable comprises a coaxial cable.

12. The bicycle helmet communication device according to claim 9, wherein said power module is positioned proximate to the waist of said bicyclist.

13. A bicycle helmet communication device comprising:
   (a) a shell for protecting the head of a bicyclist, said shell having an interior, crown, and opposite side portions, a boundary edge encircling said shell, and a notch extending upward from said boundary edge proximal to one of said side portions, a penetrating chin strap attached to said shell proximate to said boundary edge and proximate to one of said side portions, a receiving chin strap attached to said shell proximate to said boundary edge of said opposite side portion for engagement to said penetrating chin strap, said shell further having a sleeve positioned in said notch, said sleeve being and affixed to said shell;
   (b) a voice activated two-way communication module permitting wireless communication between said bicyclist and another bicycle rider, said communication module having a base positioned proximate to said boundary edge of one of said side portions, an adjustable forwardly extending boom having a microphone positioned proximate to the mouth of said bicyclist, an earpiece extending inwardly from said base for positioning over an ear of said bicyclist, an adjustable slide extending upwardly from said base positioned in said sleeve for adjustably attaching said communication module to said shell, said communication module further having an antenna attached to said base, a remotely located power module having a transmitter, receiver, and a cable connected to said communication module and to said power module, said transmitter and said receiver providing signal processing for communication between said microphone and said earpiece and for providing communication between said bicyclist and said other bicycle rider.

14. A bicycle helmet communication device comprising:
   (a) an oval dome shaped shell for protecting the head of a bicyclist, said shell having a plurality of air passages, an interior portion, front, back, crown, and opposite side portions, a boundary edge encircling said shell, a notch extending upward from said boundary edge proximal to one of said side portions, said notch extending to said crown portion, a penetrating chin strap portion attached to said shell proximate to said boundary edge and proximate to one of said side portions, a receiving chin strap portion attached to said shell proximate to said boundary edge of said opposite side portion for engagement to said penetrating chin strap portion, and a sleeve positioned in said notch, said sleeve being affixed to said shell;

(b) a voice activated communication module permitting wireless communication between said bicyclist and another bicycle rider, said communication module having a base positioned proximate to said boundary edge of one of said side portions, an adjustable arcuate shaped forwardly extending boom having a microphone positioned proximate to the mouth of said bicyclist, an earpiece extending inwardly from said base for positioning over an ear of said bicyclist, an adjustable slide extending upwardly from said base positioned in said sleeve for adjustably attaching said communication module to said shell, said communication module further having a flexible upwardly extending antenna attached to said base, said antenna being foldably positioned and secured to said shell over said crown portion between said opposite side portions, said communication module further having a remotely located power module having a cable connected to said communication module and to said antenna, a transmitter, and a receiver, said transmitter and said receiver providing signal processing for communication between said microphone and said earpiece and for providing communication between said bicyclist and said other bicycle rider; and (c) a cover engaged to and encircling said boundary edge enclosing said shell, said antenna, said notch, and said sleeve.

* * * * *